United States Patent
Cottrell et al.

(10) Patent No.: US 8,002,457 B2
(45) Date of Patent: Aug. 23, 2011

(54) PROCESS FOR BLENDING REFRIGERANTS

(75) Inventors: Stephen Cottrell, Baton Rouge, LA (US); Stephen Delo, Baton Rouge, LA (US); Clifford Riegel, Baton Rouge, LA (US); Jarrad Garrison, Baton Rouge, LA (US)

(73) Assignee: Honeywell International Inc., Morristown, NJ (US)

( * ) Notice: Subject to any disclaimer, the term of this patent is extended or adjusted under 35 U.S.C. 154(b) by 739 days.

(21) Appl. No.: 11/364,945

(22) Filed: Feb. 28, 2006

(65) Prior Publication Data
US 2006/0211897 A1 Sep. 21, 2006

Related U.S. Application Data

(60) Provisional application No. 60/657,045, filed on Feb. 28, 2005.

(51) Int. Cl.
| | | |
|---|---|---|
| G05D 11/02 | (2006.01) | |
| B01F 15/04 | (2006.01) | |
| B01F 15/02 | (2006.01) | |
| B01F 13/02 | (2006.01) | |
| B01F 13/00 | (2006.01) | |
| F17C 11/00 | (2006.01) | |
| G01N 35/08 | (2006.01) | |

(52) U.S. Cl. ............... 366/152.1; 366/152.2; 366/160.1; 366/160.2; 366/160.3; 366/160.5; 366/162.1; 366/182.2; 366/182.4; 366/131; 366/132; 366/341; 366/342; 436/55; 137/3; 137/9; 62/46.1

(58) Field of Classification Search ............... 366/152.1, 366/152.2, 160.1, 160.2, 162.1, 101, 131, 366/132, 341, 342; 137/3, 9; 436/55; 62/46.1
See application file for complete search history.

(56) References Cited

U.S. PATENT DOCUMENTS

| | | | |
|---|---|---|---|
| 3,932,154 A | 1/1976 | Coers et al. | |
| 4,580,415 A | 4/1986 | Sakuma et al. | |
| 5,127,239 A | 7/1992 | Manz et al. | |
| 5,423,607 A * | 6/1995 | Jones et al. | 366/132 |
| 5,711,158 A | 1/1998 | Yoshida et al. | |
| 6,220,747 B1 | 4/2001 | Gosselin | |
| 6,280,692 B1 * | 8/2001 | Bartlett, Jr. | 422/131 |
| 6,772,781 B2 * | 8/2004 | Doty et al. | 137/9 |
| 2003/0178597 A1 | 9/2003 | Cho | |
| 2004/0007592 A1 | 1/2004 | Pozniak | |
| 2004/0093896 A1 * | 5/2004 | Elion et al. | 62/656 |

FOREIGN PATENT DOCUMENTS

| | | |
|---|---|---|
| EP | 0 856 571 | 8/1998 |
| EP | 1 403 599 | 3/2004 |

OTHER PUBLICATIONS

Derwent abstract of JP 62 204833, 1pg. Derwent publication 1990.

* cited by examiner

*Primary Examiner* — Tony G Soohoo
*Assistant Examiner* — Dean Kwak
(74) *Attorney, Agent, or Firm* — Banner & Witcoff, Ltd.

(57) ABSTRACT

Disclosed are methods and systems for forming multi-component refrigerant compositions comprising:
(a) introducing a first refrigerant component into a vessel at a first flow rate;
(b) introducing at least a second refrigerant component into said vessel at a second flow rate, which may be the same as or different than the first flow rate, during at least a portion of said first refrigerant introducing step; and
(c) controlling at least one of said first and second flow rates to obtain the desired relative proportions of said first and second refrigerants in the refrigerant composition.

17 Claims, 1 Drawing Sheet

PROCESS FOR BLENDING REFRIGERANTS

FIELD OF THE INVENTION

The present invention relates to a process for producing compositions comprising at least two refrigerant compounds such that a substantially homogeneous refrigerant composition can be rapidly and efficiently produced.

BACKGROUND OF THE INVENTION

It has been common practice that refrigerant compositions, such as are used for refrigerators, air conditioners climate control units, industrial chilling units, and food transport and storage units, are primarily composed of substantially only one compound or component. For example, methane series CFCs, such dichlorodifluormethane (CFC-12) and methane series HCFCs such as chlorodifluormethane (HCFC-22) have commonly been used as single component refrigerants.

More recently there have been substantial reasons relating to environmental concerns to discontinue use of CFCs. For example, it is now known that CFC's tend to react with the ozone layer around the earth and thereby result in some level of ozone depletion. As a result various governmental and international organizations have been engaged in efforts to reduce or eliminate the use of CFCs. In response to these pressures, and perhaps for other reasons as well, refrigerant compositions are more frequently composed of two or more components. Generally, the refrigerant composition comprises a blend or mixture of two or more compounds, preferably but not necessarily excluding (CFCs) or (HCFCs), selected to have the desired vapor pressure, boiling point, etc. deemed to be desirable for the intended applications. In fact, the present inventors are not aware at the present time of a alternative compound which can be substituted directly in devces which use HCFC-22 as a single component refrigerant, and therefore at the present time the most promising candidates are mixed refrigerants obtained by mixing different types of compounds, including HFCs, hydrofluoroethers (hereunder referred to as "HFEs"), fluoroethers (hereunder referred to as "FEs") and fluoroiodocarbons (hereunder referred to as "FICs").

Generally, it is not possible and/or not desirable to attempt to use any one single mixed refrigerant composition for all refrigerant uses, and therefore various types of mixed refrigerants are being employed which contain combinations of 2 or 3 components in different proportions for adjustment of the properties and performance to allow their application for different uses and devices.

Methods and systems for the production of multi-component refrigerant compositions are known. For example, Australian patent application AU199852033 B2 describes a process for producing mixed refrigerants. The process described in this patent application, however, is relatively complex to execute, and furthermore is relatively time-consuming to implement. More specifically, this patent discloses a process for producing multi-component refrigerant compositions that requires a careful selection of the density of the individual components which are to be incorporated into the composition, as well as a specific sequence for the addition of the components. For three component refrigerant compositions, for example, it is therefore required to first introduce a first component into a vessel in which the mixing will be conducted and ensuring that this component has the proper density relative to the densities of the other components. It is only after this component is in the vessel that the process permits a second component to be introduced into the vessel, but once again assuring that the component with the proper liquid density is introduced into the process. Finally, once each of the first and second components are fully charged into the vessel, the third component can then be introduced into the vessel.

Applicants have therefore recognized a need for methods of producing multi-component refrigerant compositions relatively quickly, accurately, and cost effectively.

SUMMARY

Applicants have found that many of the shortcomings of the prior methods can be overcome and/or that many of the above-noted needs can be satisfied by the methods, devices and systems of the present invention. Preferred methods, for example, comprise: providing a supply of a first refrigerant component and at least a second refrigerant component; introducing said first refrigerant component into a vessel at a first flow rate; introducing said at least said second refrigerant component into said vessel at a second flow rate, which may be the same as or different than the first flow rate, at least a portion (and preferably at least a substantial portion) of said second introducing step preferably occurring while said first refrigerant introducing step is occurring; and controlling at least one of said first and second flow rates to obtain the desired relative proportions of said first and second refrigerants in the mixed refrigerant composition. In certain highly preferred embodiments, the first introducing step and second introducing step occur substantially simultaneously.

As used herein, the term "component" with respect to a refrigerant is not necessarily limited to a refrigerant which consists only of a single compound. Instead, the term "component" is used in its broad sense to refer to not only refrigerants consisting of a single compound but also to refrigerants which consist of what are more compounds that had been previously combined and form, for the purposes of the present invention, a fluid or fluid stream.

The term "vessel" is used herein in its broadest possible sense to include any device, apparatus or configuration which facilitates and permits two or more fluids, particularly and preferably fluid streams, to be combined or joined to produce a homogeneous fluid containing the components of the first and second fluids. Thus, the term "vessel" as used herein means not only vessels such as tanks, but also vessels which include static mixing devices, jet mixers, venturi mixers, conduits, manifolds and the like.

In certain of the preferred methods, devices and systems, the refrigerant composition does not have a substantial negative effect on atmospheric chemistry. More specifically, in the preferred methods a mixed refrigerant is produced which has a very low or negligible contribution to ozone depletion. In certain embodiments it is also preferred that the refrigerant produced in accordance with the present invention possesses a relatively low global warming potential.

BRIEF DESCRIPTION OF THE DRAWING

The invention will now be described with reference to the accompanying drawings in which.

DETAILED DESCRIPTION OF PREFERRED EMBODIMENTS

Figure 1:
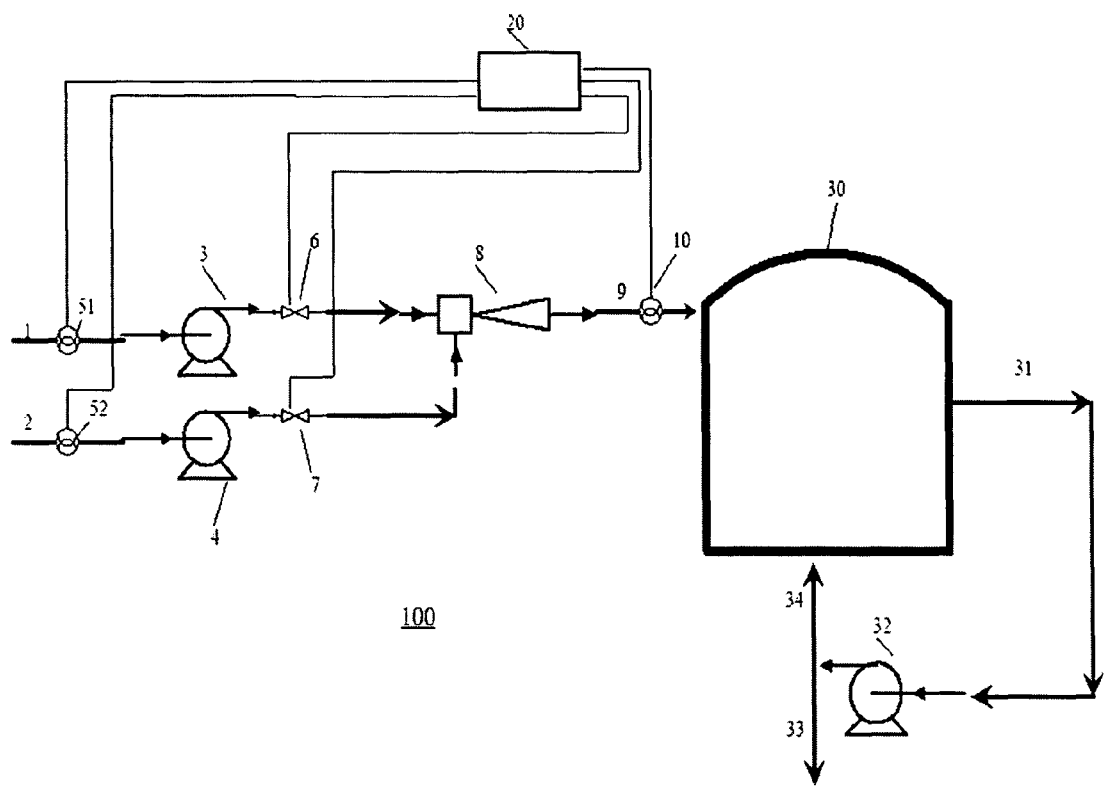
FIG. 1 is a schematic flow diagram according to one embodiment of the present invention.

FIG. 1 shows a block diagram of a system 100 according to one embodiment of the present invention for providing a multi-component refrigerant mixing system. The exemplary mixing and control system 100 comprises means for introducing a first refrigerant component into the system and means for introducing at least a second refrigerant component into the system. It will be appreciated by those skilled in the art that many varied and appropriate means are adaptable for use in accordance with present invention, depending upon the particulars of the system and the refrigerant being formulated. In the specific embodiment illustrated in FIG. 1, the means comprise a plurality of raw material feeds, such as feeds 1 and 2, which in many preferred embodiments comprise a pipe or conduit through which the respective refrigerant components flow. The feeds may be fed from a storage tank (not shown) or may be fed directly to the pump, such as pumps 3 and 4, from an upstream process or unit operation. It is contemplated that the use of a storage tank or other storage system will be preferred in many embodiments. Of course, the present invention is adaptable for use in connection with additional feeds beyond the first and second feeds, including the use of at least three and in certain embodiments at least four feeds.

Each feed line 1 and 2 preferably includes a flow measurement apparatus, preferably a mass flow measurement instrument as indicated at 51 and 52. A controller is preferably connected to each of the mass flow instruments and is adapted to read, manipulate and/or store the mass flow information measured thereby. Each feed line is preferably connected to means for moving the feed material, preferably through a pipe or conduit, such as pumps 3 and 4. The pumps may include provisions to recirculate the feed back to the pump inlet or to a storage system for the feed in order to reduce pressure variations and vapor locking of the pumps, thereby improving the accuracy of the system.

Respective control valves 6 and 7 are preferably located downstream of pumps 3 and 4 and are preferably under the control of controller 20. Although controller 20 is shown as a single box in FIG. 1, those skilled in the art will appreciate that controller 20 may include two or more discrete control units, microprocessors, computers and the like adapted to perform the monitoring, control and calculation functions described herein. It is contemplated that the control means of the present invention may comprise any one or more components known to those skilled in the art for use in accordance with the teachings contained herein, and all such components and combinations of components, including software, algorithms and hardware, are within the scope of the present invention. It is contemplated that in certain embodiments, for example, the control means of the present invention comprises automatic control means, such as distributed control systems (DCS), programmable logic controller (PLC), or the like. It will be appreciated, of course, that the monitoring, control and calculation functions could be conducted manually by a human operator of the present system, although such an embodiment is generally not preferred.

A mixing apparatus, such as a jet mixer 8 as shown or some other form of mixer such as a static mixer, is preferably included and preferably functions to achieve substantially homogeneous mixing of the first and second feed streams. The combined feeds preferably exit the mixer 8 as a single stream 9. The present invention also preferably includes means for measuring the flow rate, and preferably the mass flow rate, of the combined fluid produced in accordance with the present invention. With particular reference to FIG. 1, for example, the outlet stream 9 preferably includes or interfaces with means for measuring the flow, and preferably the mass flow, of the combined fluid stream, such as by a mass flow instrument 10, which is also preferably connected to controller 20.

Although the flow meters are illustrated as being upstream of the pumps and the control valves downstream of the pumps, those skilled in the art will appreciate that in certain cases it may be desirable to use a different configuration, and all such configurations are within the scope hereof.

In certain embodiments, particularly embodiments involving continuous or semi-continuous operations, the outlet stream 9 may be introduced to one or more downstream vessels for further processing or storage as a mixed refrigerant product. For example, a storage tank 30 may be provided for holding for a predetermined period the mixed refrigerant. It will also be appreciated that in certain embodiments it may be beneficial, for cost reasons for example, to eliminate the separate mixing means 8 and put the storage means, such as 30, to a dual use in which it mixes and stores the mixed refrigerant. Particularly is such embodiments, the storage tank 30 preferably includes and/or interfaces with a recalculating system which aids in achieving uniform mixing. More particularly, the storage tank in such embodiments may include a pump 32 which draws a mixed refrigerant stream 31 from the storage tank and is capable of pumping finished product 33 to packaging, further processing or use, or the like. Alternatively, the pump may be used, with appropriate manifolding, to also or alternatively introduce stream 34 back into the storage tank 30. A mass flow sensor and appropriate valving may also be included in lines 31, 33 and 34 to effect other or improved control processing, as described more fully hereinafter.

In addition to the mass flow sensors, the present systems may include one or more sensors, which may be local or remote (not shown), and are preferably capable of continuously or batchwise monitoring of the composition of one or more of the feed and/or mixed refrigerant streams. The preferred online analyzer can monitor system performance, such as the composition of the mixed refrigerant. This information can be used as feedback from the onstream analyzer, which is compared to the computed blend composition. Based on this comparision, the blend ratios can be biased to bring the final composition to within a desired range and/or specification limits.

In certain embodiments, the system includes means for providing positive shutoff of the feed flow at the end of the batch or if the blend sequence is interrupted, minimizing composition errors for the mixed refrigerant.

In certain preferred embodiments one or more of the pumps are provided with coolers which cool the stream and help to minimize composition shift resulting from heat added by the pump.

In operation, the preferred systems and methods monitor (generally by way of the controller 20 and/or other associated instruments and equipment) the flow of all the components which are to be incorporated into the desired mixed refrigerant product, such as by using the mass flow meters mentioned above. The valve conditions are also preferably monitored. The controller or related equipment preferably determines the least capable flow, that is, the flow of the feed material which is closest to being at the maximum rate permitted by equipment being used. The least capable flow controller output is then preferably used as a process variable for input to a total flow controller. The total flow controller output is then preferably multiplied by the computed blend ratios and used as a setpont (for example as cascade setpoints) for the raw material flow controllers. The methodology in preferred embodiments maximizes the flow of raw materials to the blend tank while maintaining the target composition and minimizing the blending cycle time. For batch systems, the cycle time is preferably inversely proportional to the system capacity.

In certain preferred embodiments the composition of various target mixed refrigerants is stored, preferably in the controller or associated computer processing equipment. In such embodiments, the error in mixed refrigerant composition can be minimized relative to manual calculation and data in controller entry.

Thus, the preferred automatic systems of the present invention provide several advantages. For example, it is possible in accordance with the automatic systems of the present invention to create a batch record in the event of customer complaints or process improvement activities. Furthermore, this feature allows the use of the automated system to make new or custom blend compositions that are not pre-stored in the controller, and it also provides means for allowing the operator to know the composition throughout the batch and intervene if necessary, minimizing or eliminating off specification product being produced.

While automatic control is described generally herein, the preferred embodiments include means to switch the system to allow manual override control, which enhances the ability of the operators to make manual adjustments and fixes if there is a malfunction during the blend sequence.

Preferred aspects of the present invention provide methods and systems that conduct the blending or mixing step directly into a product storage tank, which in certain preferred operations is used to feed the packaging operation. Additionally, the system can blend directly into a shipping container (ISO, tank trailer) which minimizes labor and blend composition shifts that occur during inter-tank transfers.

EXAMPLES

Example 1

A 90,000 pound blend of R-410A (which is 50 wt % HFC-32 and 50 wt % HFC125) is desired to be made into a blend storage tank based on three feed stocks: (1) about 6500 pounds of a blend having a composition of 53% by weight R-125 and 47% by weight of R-32 contained in a storage tank; R-125 (available in amounts not limited for the purposes of this example); and R-32 (available in amounts not limited for the purposes of this example). The amount of the mixed composition in storage and the percentage of components therein by weight, the desired composition of the product in the storage tank (that is, R-410A), and the final storage contents by weight (that is 90,000) are entered into the control system. The R-125 and R-32 feed pumps are started. The blend is started.

The batch controller performs the proper calculations to determine the component quantities and utilizes the flow limit control scheme described above. More specifically, it selects the valve with the largest percent opening and uses it as the process variable input for a total flow controller. The setpoint of the total flow controller is 75%. The output of the controller is the total flow of raw materials to the blend storage. The individual component target compositions are multiplied by the total flow to generate the setpoints for the each of the raw material flow controllers.

The R-125 and R-32 are instantaneously mixed in the appropriate ratio and fed to the blend storage. When the target weight is reached, the R-125 and R-32 feeds are stopped. The storage is circulated for one hour and then sampled for composition. The blend is within specification without readjustment. The total cycle time for the batch sequence was 3.5 hours.

What is claimed is:

1. A method for forming in a storage tank a mixed refrigerant composition comprising:
   (a) introducing a first refrigerant component into a storage tank at a first flow rate;
   (b) introducing at least a second refrigerant component into the storage tank at a second flow rate, which may be the same as or different than the first flow rate, during at least a portion of said first refrigerant introducing step; and
   (c) controlling at least one of said first and second flow rates to achieve a blend ratio of said first and second refrigerants,
   wherein an output of a control valve is a process variable input to a controller that controls a total flow of said first refrigerant component and said second refrigerant component, and wherein said control valve controls a flow of said first refrigerant component or said second refrigerant component.

2. The method of claim 1 wherein said controlling step comprises monitoring said first and second flow rates.

3. The method of claim 2 wherein said controlling step further comprises controlling the rate at which at least one of said first or second components is introduced into said storage tank.

4. The method of claim 1 wherein said storage tank is a shipping container.

5. The method of claim 4 wherein said shipping container is a tank trailer.

6. The method of claim 1 wherein said controlling step comprises monitoring the composition of at least one of said first or said second components.

7. The method of claim 1 wherein said controlling step comprises monitoring the composition of the refrigerant in said storage tank.

8. The method of claim 1, wherein said output of said control valve is a percent opening of said control valve.

9. The method of claim 1, wherein said control valve is whichever of a first refrigerant component flow rate control valve or a second refrigerant component flow rate control valve has the largest percentage opening during at least said portion of said first refrigerant introducing step.

10. A system for forming in a storage tank a mixed refrigerant composition comprising:
    (a) means for continuously introducing a first refrigerant component into the storage tank at a first flow rate;
    (b) means for continuously introducing at least a second refrigerant component into the storage tank at a second flow rate while said first refrigerant is being introduced in the storage tank, which may be the same as or different than the first flow rate;
    (c) means for controlling at least one of said first and second flow rates to achieve relative proportions of said first and second refrigerants within desired relative proportions in said storage tank; and
    (d) means for inputting an output of a control valve as a process variable to a controller that controls a total flow of said first refrigerant component and said second refrigerant component, wherein said control valve controls a flow of said first refrigerant component or said second refrigerant component.

11. The system of claim 10 wherein said controlling means comprises means for monitoring said first and second flow rates.

12. The system of claim 10 wherein said means for introducing said first refrigerant component and said means for introducing said second refrigerant component comprise raw material feeds.

13. The system of claim 12 wherein said controlling means comprises means for controlling the rate at which at least one of said first or second components is introduced into said storage tank.

14. The system of claim 10 wherein said controlling means comprises means for monitoring the composition of at least one of said first or said second components.

15. The system of claim 10 wherein said controlling means comprises means for monitoring the composition of the refrigerant in the storage tank.

16. The system of claim 15 wherein said controlling means comprises means for adjusting the rate of flow of at least one of said first or second components based on a result of said monitoring step.

17. A method for forming a multi-component refrigerant composition comprising:

(a) flowing a first refrigerant component at a first flow rate;
(b) blending, with said first refrigerant component during step (a), at least a second refrigerant component at a second flow rate, which may be the same as or different than the first flow rate; and
(c) inputting an output of a control valve as a process variable to a controller that controls a total flow of said first refrigerant component and said second refrigerant component, to provide a mixed refrigerant stream having a desired blend ratio of said first and second refrigerant components, wherein said control valve controls a flow of said first refrigerant component or said second refrigerant component.

* * * * *